United States Patent

Schaedler et al.

[15] 3,667,345

[45] June 6, 1972

[54] AIR SHUT-OFF TORQUE RESPONSIVE CONTROL VALVE UNIT FOR PNEUMATICALLY POWERED TOOLS

[72] Inventors: Raymond J. Schaedler; Lester A. Amtsberg, both of Utica, N.Y.

[73] Assignee: Chicago Pneumatic Tool Company, New York, N.Y.

[22] Filed: Aug. 19, 1970

[21] Appl. No.: 65,059

[52] U.S. Cl. ................................. 91/59, 173/12, 173/169, 192/150
[51] Int. Cl. ........................................ B23b 45/04
[58] Field of Search .......................... 173/169, 12; 81/52.4 R; 415/503; 137/505.13; 91/59; 192/150

[56] References Cited

UNITED STATES PATENTS 3,373,824  3/1968  Whitehouse ..................... 173/169 X Primary Examiner—Carlton R. Croyle
Assistant Examiner—Richard J. Sher
Attorney—Stephen J. Rudy

[57] ABSTRACT

A completely assembled air shut-off control valve unit illustrated as fitted in a bore of a pneumatically powered nut runner in the path of air flow between the throttle valve and the motor. The unit is of capsule form defined by means of a shell in which the various components are confined. A cap closes over an open end of the shell through which end the various components may be withdrawn. The valve is of a piston and rod form having a spring load in association with an adjusting screw and travel nut means for adjusting the load of the spring upon the valve. Structural design of the valve, together with a valve guide serve to effect pneumatic balancing of the valve and consequent reduced friction in its movement.

9 Claims, 6 Drawing Figures

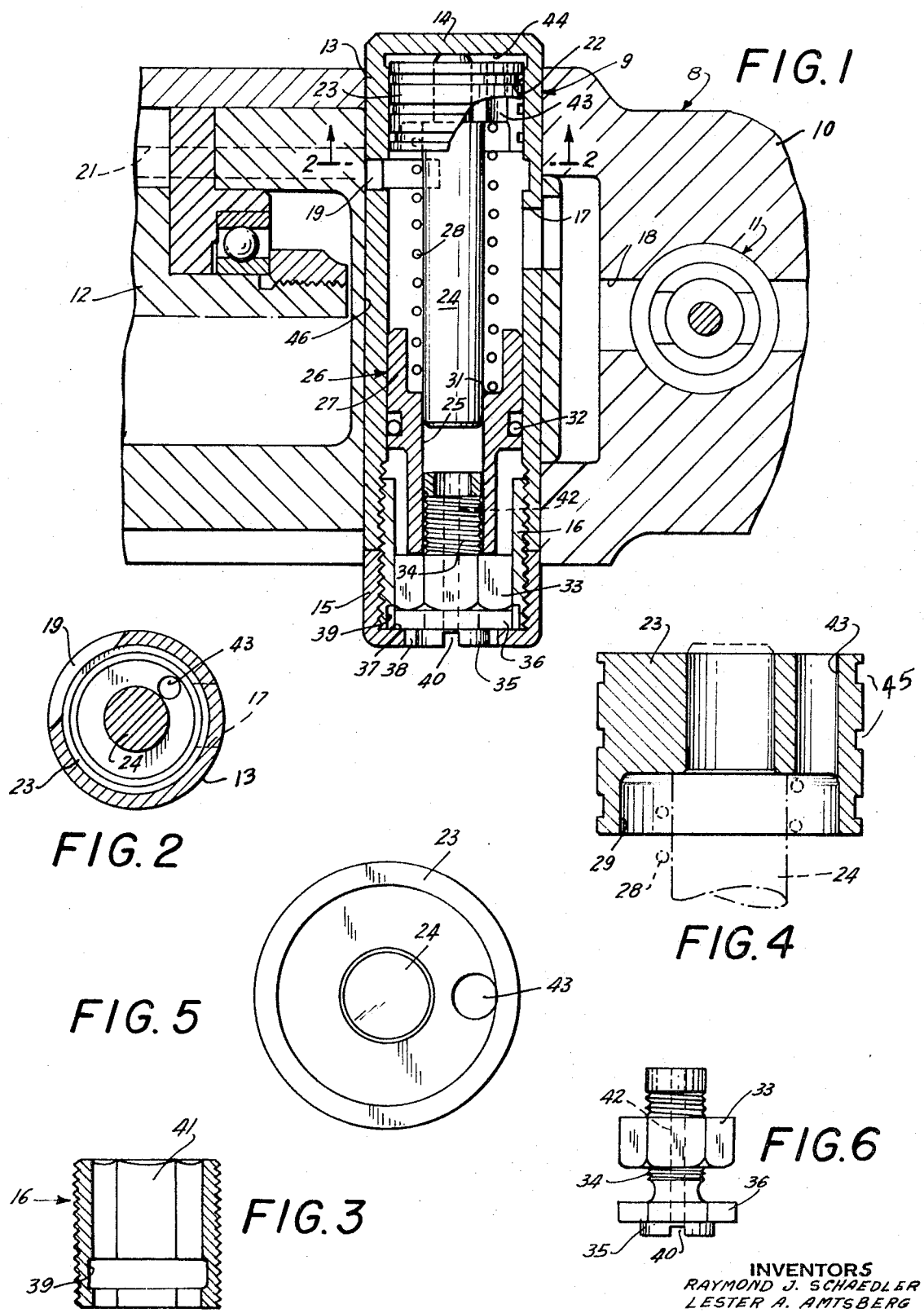

AIR SHUT-OFF TORQUE RESPONSIVE CONTROL VALVE UNIT FOR PNEUMATICALLY POWERED TOOLS

BACKGROUND OF THE INVENTION

This invention relates to torque control devices of the air shut-off type for pneumatically powered tools such as nut runners and the like used in driving threaded fasteners. The general purpose of the device is to cause operating air feed to the motor to be automatically shut off when a predetermined degree of torque has been delivered to the work.

Control devices of this general nature are known from U.S. Pat. Nos. 2,952,176 and 3,373,824, wherein the device is incorporated in the body of the tool between the throttle valve and the motor. These known devices are not units completely assembled apart from the housing of the tool. They cannot, because of their construction, be removed or assembled into the housing as a single unit but are required to be assembled therein piece by piece. It is also required that portions of the housing be tapped for reception of some of their parts. Further, the device of U.S. Pat. No. 3,373,824 is of a complex structure, apparently required because of its high sensitivity. Nor do these known structures have the advantageous construction or features of the subject invention.

The general objective of the present invention is to provide a torque responsive air shut-off control of an improved nature for pneumatically powered tools, such as nut runners and the like.

A feature of the invention is that it is a fully assembled unit apart from the tool and as a fully assembled unit is adapted to be fitted to or removed as such from the tool.

Another feature of the invention lies in the construction of its valve element which is designed to become pneumatically balanced about its periphery through the use of peripheral channels whereby it is enabled to operate with a minimum of friction. This feature also serves as a means for collecting residual oil mist from the operating air and utilizing it as a lubricant for the valve.

Another feature lies in the piston and rod design of its valve which does not require complex precision machining nor multiple porting holes.

Another feature is represented by a guide member which serves to not only guide the valve in its movement but also serves as a balancing support for the valve. In addition, this member serves to seal the piston chamber against undesirable air leakage.

Another feature lies in the use of a screw and travel nut combination for making adjustments in the spring load. The threaded area of the screw is wholly contained at all times within the interior of the unit and guarded against exposure to dust and dirt.

Nor is there any chance of the travel nut working free of its adjusted position. This is due to the association with the adjusting screw and travel nut of a sleeve-lock, and a retaining closure cap for the unit threadedly engaged with the sleeve-lock. In this arrangement, the load of the valve spring exerts a constant linear load through the travel nut and screw upon the cap relative to the sleeve-lock.

These various features, as well as others, and also the various advantages flowing therefrom, will become apparent as the description of the device continues in detail with reference to the accompanying drawing.

BRIEF DESCRIPTION OF THE DRAWING

In the accompanying drawing:

FIG. 1 is a sectional view through a pneumatically powered nut running tool wherein the air shut-off control valve unit is shown as fitted in a bore extending transversely of the housing of the tool; only so much of the tool is shown as needed to illustrate the arrangement;

FIG. 2 is a section through the valve unit on line 2—2 of FIG. 1;

FIG. 3 is a detail in vertical section of the sleeve-lock;

FIG. 4 is a detail in vertical section through the valve;

FIG. 5 is a bottom plan view of the valve; and

FIG. 6 is a view in elevation of the adjusting screw and travel nut.

DESCRIPTION OF A PREFERRED EMBODIMENT

In the accompanying drawing is shown an air powered tool, such as a nutrunner 8, in which an air shut-off control valve unit 9 is incorporated; only so much of the nut running tool is shown as required to provide a clear understanding of the invention. The tool includes a housing 10 in which a manually operable throttle valve 11 is incorporated for regulating pressure air flow to an air-driven motor 12 of the tool. The motor is of a conventional radially slidable vane rotary type. The valve unit 9 is fitted into the housing in the path of air flow between the throttle valve and the motor. During operation of the tool in running down a nut, the valve unit is responsive to a predetermined torque load on the motor to shut off flow of operating air from the throttle valve to the motor.

The valve unit 9 is of capsule form. It includes a tubular shell 13 which is closed at one end by means of an integral wall 14 and is provided with a cap 15 at its other end. All of the components of the unit are contained within the capsule. An externally threaded lock-sleeve 16 couples the cap to the shell. The sleeve is threaded in part into the shell; and has a part projecting from the shell over which the cap is threadedly engaged.

The shell has a side inlet port 17 with which the throttle valve connects by means of a housing passage 18. An arcuate slot 19, defining an outlet port through a side area of the shell, connects through a housing passage 21 with the motor chamber. The shell provided a cylindrical interior chamber 22 in which a control piston valve 23 is axially movable to open and closed positions relative to the outlet 19.

The piston valve is fixed axially to one end of a piston rod 24. The valve has a bearing relation to the wall of the piston chamber. The lower portion of the piston rod depends at all times slidably into a bore 25 extending axially through a valve pilot or guide member 26. The guide has a cup-like portion 27 of enlarged diameter from which axially depends a stem of reduced diameter. The periphery of the cup-like portion has a bearing relation to the wall of the piston chamber. The support provided by the wall of the piston chamber to the valve 23 and to the valve guide 26, together with the support provided by the guide to the piston rod 24 maintains the axis of the valve at all times in coinciding relation to the axis of the piston chamber. By means of this advantageous construction, the valve is restrained against vibration or side-to-side movement relative to the piston chamber, and consequently is enabled to move in the latter with a minimum of friction.

The piston valve is biased by means of a spring 28 toward one end of the piston chamber 22, as in FIG. 1. In this normal position, it is clear of the outlet 19 as well as of the inlet 17. In this condition of the valve, live air entering the piston chamber from the inlet 17 flows through the outlet 19 to operate the motor. The spring is seated (FIGS. 1 and 4) at one end in an annular recess 29 of the valve; and is seated at its other end upon an internal shoulder 31 of the valve guide. An O-ring seal 32 in the valve guide seals against leakage of air around the guide from the piston chamber.

Means is provided for adjusting the load of the spring 28 upon the piston valve. This means includes the valve guide 26, the shoulder 31 of which abuts and end of the spring, and the stem of which is held at all times under the load of the spring in abutment with a travel nut 33. An adjustable screw 34 is threadedly engaged in the nut and projects at its inner end axially into the bore of the valve guide. The outer end of the screw is formed with a head 35 having a flanged portion 36 which is disposed within the lock-sleeve 16 and rests under the load of the spring upon an inturned annular flange 37 of the cap 15. The head of the screw is located with a surrounding clearance in an end opening 38 of the cap. A slot 40 in the head of the screw is exposed through the opening in the cap to permit easy application of a screw driver thereto. A clearance surrounding the flanged portion 36 of the screw head is provided by means of an internal groove 39 in the lock-sleeve which enables the flanged portion to turn with the screw relative to the lock-sleeve 16. The lock-sleeve has a multi-sided internal wall surface 41 (here of hex form) with which a complementary peripheral surface of the nut 33 bears in axially slidable relation. By means of the foregoing construction, the lock-sleeve 16 serves to guide the nut 33 for relative axial travel and restrains the nut against relative rotation, as the screw 34 is turned in one direction or the other.

It can be seen that turning of the screw in a counter-clockwise direction (FIG. 1) upon application of a screwdriver to its slotted end will force the nut 33 and guide 26 to slide upwardly against the spring to increase the spring load upon the valve 23. Turning the screw in a clockwise direction will serve to relax the spring load upon the valve.

The screw 34 has a further function in that its inner end serves as a stop that is cooperable with the rod 24 of valve 23 to limit the extent of axial movement of the valve away from its normal position. The extent of this movement is sufficient to allow the valve to close over the outlet port 19 so as to block flow of operating air therethrough; but the movement is not enough to close over the inlet port 17 so that inlet air continues to enter the piston chamber after the outlet port is closed.

The piston valve 23 is provided with a restricted passage 43 which communicates the piston chamber area at the inner end of the valve through the valve with a slight clearance 44 at the rear end of the valve. This clearance is created by the abutment with the end wall of the shell of a narrow slightly projecting end of the piston rod. Live air entering the piston chamber from the inlet port 17 normally flows freely and in substantially equal volume through the outlet port 19 since the latter is of substantially the same area size; and it bleeds through the restricted passage 43 in the valve to fill the clearance 44.

The surface area of the rear end of the piston valve adjacent the clearance 44 is greater than that of its inner end but, because of the spring load acting upon the valve and because of the free movement of the inlet air through the outlet, air pressure in the clearance does not normally develop sufficiently to overcome the resistance of the spring load. But when, because of the development of a predetermined torque load upon the motor, as occurs when the work is set, back pressure develops in the clearance 44 and builds up to a degree sufficiently to overcome the resistance of the spring load, the back pressure forces valve 23 downwardly to close over the outlet 19 any air that might leak around the piston rod to the area at its underside vents to atmosphere in conventional manner, such as through a hole 42 in the screw 34. Closing of the outlet blocks air flow to the motor; but inlet air continues as long as the throttle valve 11 remains open to flow through the unclosed inlet 17 into the piston chamber and through the restricted passage 43 to the clearance 44 where it acts to hold valve 23 in closed condition. When the throttle valve is released to closed condition, the spring returns the piston valve 23 to its open condition as air bleeds from the clearance 44 to the outlet 19 to be vented through the motor.

The piston valve 23 is formed with a plurality of channels 45, each of which extends fully around its periphery in spaced parallel relation to the others. The channels provide a desirable advantage. They facilitate movement of the valve with a minimum of friction. In this respect, inlet air bleeding around the valve into the channels rapidly and completely fills them. The pressure of the inlet air within the channels acting upon the valve becomes evenly distributed so that the valve becomes pneumatically balanced with respect to the air pressure acting about its periphery. As a consequence, the valve is enabled to move within the piston chamber with a minimum or lesser degree of friction than would otherwise be the case were the channels not present and air pressures were permitted to develop randomly about the side area of the valve.

The channels 45 provide a still further benefit in that they serve to collect some of the oil mist normally present in the operating air. This result serves to promote lubrication and further easy movement of the piston valve.

The spring load 28 upon the piston valve determines the value of the torque load required to develop on the motor at which the piston valve 23 will be forced to move to closed condition; and it determines the degree of torque delivery to the work. This torque valve may be varied as desired by selective adjustment of the screw 34.

As earlier mentioned, the air shut-off control device 9 is a complete unit. All of its components are confined within its shell 13 and are retained therein by means of the cap 15. The unit is of cylindrical form having a uniform outer diameter of its length and is fitted in an open ended bore 46 extending transversely through the general housing 10 of the tool. It is press-fitted into the bore so as to retain its proper position therein. The cap portion 15 is designed, as appears in FIG. 1, to project beyond the adjacent surface of the housing of the tool. This provides a special advantage in that it not only facilitates access of a screw driver to the slotted head of the adjusting screw 35; but it also permits ready unscrewing of the cap from the shell for repair or replacement 'f the internal components of the unit. When the cap is removed, the adjusting screw, together with the travel nut 33, may be readily dropped out for inspection. To remove the rest of the components, it is only required to unscrew the sleeve-lock 16 with the aid of a hex wrench. The remaining components may thereafter be dropped out of, or readily slid from, the shell. Further, since the device 9 is a completely assembled unit apart from the tool, it may be pressed out in its entirety and replaced, if needed, with a new one.

What is claimed is:

1. In a nut running tool including a housing fitted with a throttle valve and containing an air-driven motor, wherein the throttle valve connects by means of a pressure air feed passage with a side wall area of a bore in the housing and the bore connects by means of an outlet passage through its side wall area with the motor; a pressure responsive air shut-off control valve unit comprising a capsule closed at both ends removably inserted in the bore and defining within the interior of the capsule a piston chamber having an inlet port registered with the feed passage and an outlet port registered with the outlet passage so as to provide through the chamber a pressure air flow passage between the throttle valve and the motor, a piston valve slidable axially within the chamber from a normally open position clear of the outlet and inlet ports to a position closed only over the outlet port, stop means within the chamber having cooperation with the piston valve to limit the latter from moving beyond its closed position, the inlet port having a location at which it is at all times not subject to being closed by the piston valve, a restricted passage through the piston valve communicating the piston chamber at an inner end of the piston valve with a clearance defined in the piston chamber at the rear end of the piston valve, the area of the piston valve over its rear end being greater than that over its inner end, the piston valve having a tendency under pressure of inlet air developing in the clearance to slide to its closed position, and a spring within the chamber normally biasing the piston valve to its open position exerting a load upon the piston valve predetermining the degree of air pressure required to develop in the clearance to overcome the spring load; wherein the piston valve has a axially depending stem, and a valve guide slidably arranged within the capsule has an axial bore the wall of which provides a bearing surface for the stem.

2. In a nut running tool as in claim 1, wherein a load spring encircles the stem, one end of the spring being in abutment with the inner end of the valve, the other end abutting the guide, and adjusting means is provided within the capsule for adjustably sliding the guide axially relative to the spring so as to vary the load of the spring upon the valve.

3. In a nut running tool as in claim 2, wherein the adjusting means includes a travel nut lying in abutment with an end of the guide having axial movement within the capsule but restrained against relative rotation, and manipulative screw means is provided for causing axial travel of the nut relative to the end of the guide.

4. In a nut running tool as in claim 3, wherein the screw means includes a head having a screwdriver slot externally exposed through an axial opening in the cap.

5. In a nut running tool as in claim 1, wherein the piston valve is defined by means of a cylindrical head mounted axially to an end of the stem, the piston chamber providing a bearing surface for the periphery of the head, the head being provided with a plurality of parallel channels extending fully about its periphery, which channels are subject to being filled with bleed pressure air from the piston chamber about the periphery of the head, the air upon filling the channels serving to exert axially directed balancing forces upon the head.

6. In a nut running tool as in claim 5, wherein the pressure air carries an oil lubricant, and the channels serve as collectors for some of the lubricant so as to provide lubricant uniformly about the periphery of the head.

7. In a tool including a piston valve chamber having a side inlet connectible with a source of pressure air and having a side outlet spaced axially rearwardly of the inlet connectible with an air driven load, a piston valve pneumatically slidable axially in the chamber to open and closed positions relative to the outlet, stop means preventing the valve from moving sufficiently to close over the inlet, spring means normally biasing the valve to its open position and determining the degree of air pressure required to develop over the rear face of the valve to force the valve to its closed position, the rear face of the valve being of greater area than its forward face and exposed to a clearance rearwardly of the valve, a restricted orifice through the valve communicating the chamber area forwardly of the valve at all times with the clearance, and the outlet being of greater cross sectional area than the orifice, the valve being responsive to development through the orifice of a predetermined air pressure in the clearance as a consequence of a predetermined back pressure created by the air driven load to slide to closed position over the outlet against the resistance of the spring, and the orifice continuing after the valve has moved to its closed position to communicate inlet air entering the chamber with the clearance; wherein the valve has a plurality of spaced parallel channels about its periphery into which air entering the piston valve chamber is adapted to bleed, the bleed air upon filling the channels serving to provide pneumatically balancing axially directed air pressure about the periphery of the valve.

8. In a nut running tool including a housing, an air driven motor, a port in the housing connected with the motor, a slide valve movable axially in the housing relative to the port upon application of pneumatic pressure to one end of the valve, a spring at the opposite end of the valve normally biasing the valve to an open condition relative to the port and determining the value of pneumatic pressure required to be applied to the valve to move it to its closed condition over the port, a slide member, the spring being compressed between one end of the slide member and the valve, and adjusting means for adjustably sliding the slide member axially relative to the spring; wherein the adjusting means includes a travel nut lying in abutment with an opposite end of the slide member having axial movement within the housing but restrained against relative rotation, and manipulative screw means is provided for causing axial travel of the nut relative to the said opposite end of the slide member.

9. In a nut running tool as in claim 8, wherein the screw means includes a head having a screwdriver slot externally exposed through an opening in the housing.

* * * * *